United States Patent [19]

Ferri

[11] Patent Number: 4,702,402
[45] Date of Patent: Oct. 27, 1987

[54] PRODUCT COUPON CONTAINER ATTACHABLE TO SHOPPING CART

[76] Inventor: Vincent J. Ferri, 1 Peachtree La., Burlington, N.J. 08016

[21] Appl. No.: 920,216

[22] Filed: Oct. 17, 1986

[51] Int. Cl.[4] .................................... B62D 39/00
[52] U.S. Cl. ............................ 224/277; 224/273; 220/22.4; 280/33.99 A
[58] Field of Search ............... 280/33.99 A, 33.99 H, 280/DIG. 4; 224/273, 275, 42.42, 42.44, 42.43, 277; 206/558, 504, 232; 220/22.1, 22.3, 23.4

[56] References Cited

U.S. PATENT DOCUMENTS

| | | |
|---|---|---|
| 1,817,706 | 8/1931 | Peavey ............................ 206/232 X |
| 1,975,173 | 10/1934 | Pennock et al. ..................... 206/232 |
| 2,888,761 | 6/1959 | Miller . |
| 3,251,543 | 5/1966 | Bush et al. . |
| 3,288,478 | 11/1966 | Powers . |
| 3,464,135 | 9/1969 | Eidinger ........................... 206/232 X |
| 3,534,973 | 10/1970 | Elliott ............................ 280/33.99 A |
| 3,539,204 | 11/1970 | Keller ......................... 280/33.99 A X |
| 3,677,570 | 7/1972 | Hedu ............................. 280/33.99 A |
| 3,956,841 | 5/1976 | Hensel . |
| 3,993,319 | 11/1976 | Day . |
| 4,005,800 | 2/1977 | Schurman ........................... 220/337 |
| 4,034,539 | 7/1977 | Economy . |
| 4,156,318 | 5/1979 | Economy ..................... 280/33.99 A X |
| 4,192,562 | 3/1980 | Bishoff et al. ................. 220/23.4 X |
| 4,274,567 | 6/1981 | Sawyer . |
| 4,372,444 | 2/1983 | LeGrand et al. ............... 220/22.3 X |
| 4,376,502 | 3/1983 | Cohen . |
| 4,450,994 | 5/1984 | Holland ............................. 224/277 |
| 4,453,788 | 6/1984 | Russell ......................... 224/273 X |
| 4,487,134 | 12/1984 | Foote ......................... 280/33.99 A |
| 4,542,930 | 9/1985 | Adams ........................... 220/23.4 X |
| 4,545,484 | 10/1985 | Rohner ......................... 220/22.3 X |
| 4,577,773 | 3/1986 | Bitel ............................... 220/22.3 |
| 4,583,753 | 4/1966 | Economy . |
| 4,643,280 | 2/1987 | Hensley ......................... 224/273 X |

Primary Examiner—Henry J. Recla
Assistant Examiner—Robert M. Petrik
Attorney, Agent, or Firm—Thomas A. Lennox

[57] ABSTRACT

A product coupon container attachable to a shopping cart across the rear upper edge bar of the basket and the upper bar of the infant seat in the open position including two boxes, each with lids and a horizontal member extending downwardly from each lengthwise edge of each box with a hole proximate to one end opening downwardly and to the side of the horizontal member together with a plurality of holes at the end of each member such that when two of the containers are slideably interconnected, the combination spans the distance between the two bars and the holes engage in the bars at the top of the shopping cart.

18 Claims, 11 Drawing Figures

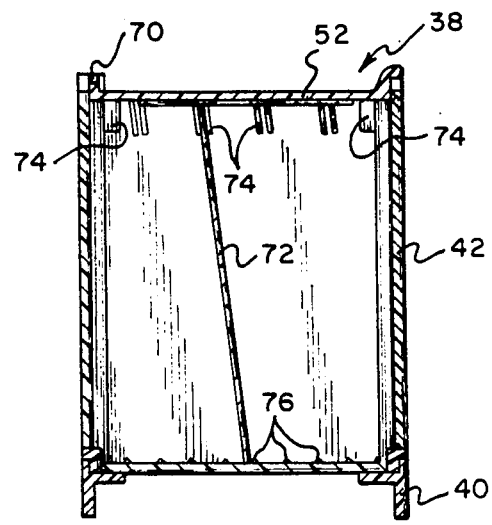
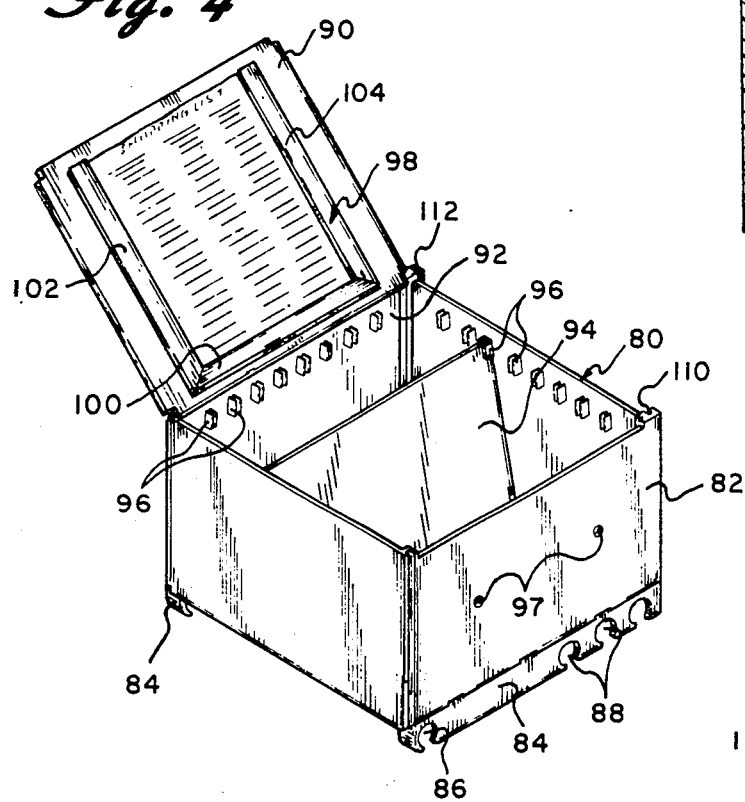
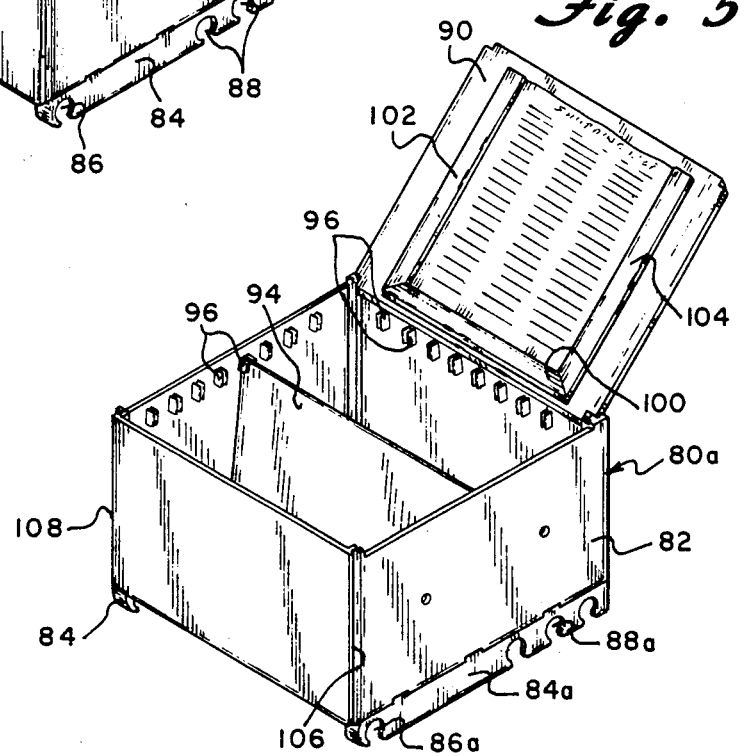

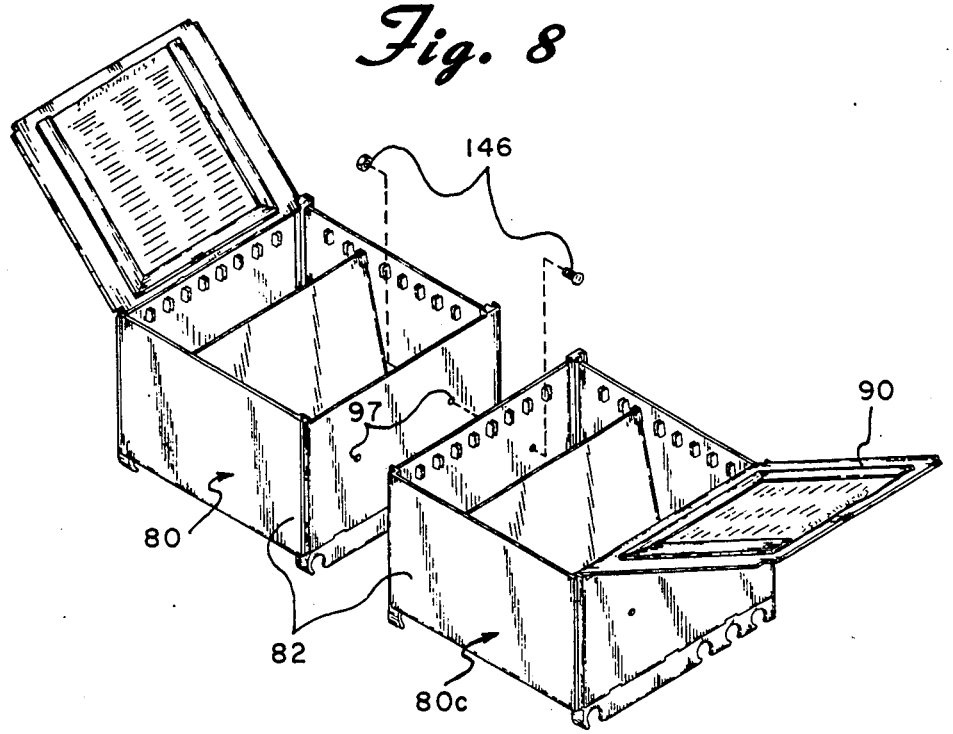
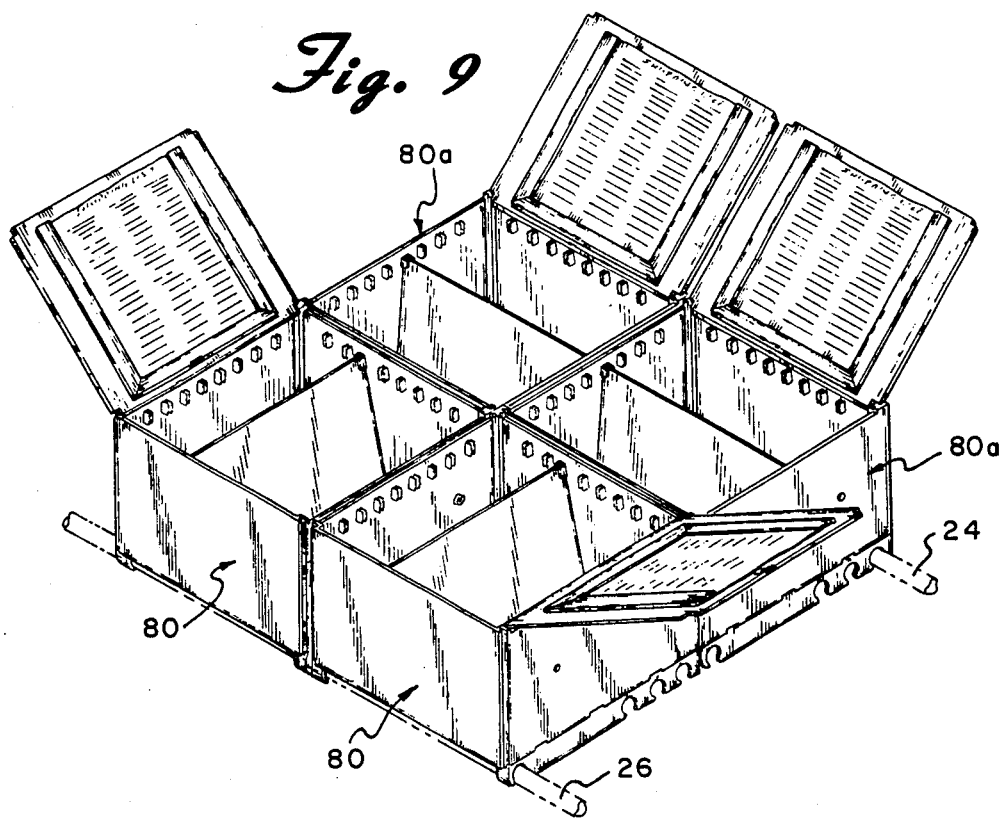

PRODUCT COUPON CONTAINER ATTACHABLE TO SHOPPING CART

BACKGROUND OF THE INVENTION

This invention involves a box device to hold product discount coupons that provide reduced prices on certain goods, usually sold in supermarkets. In particular, this invention involves a coupon box that is attachable to the top of a shopping cart.

The term "product coupon" is intended to include all discount coupons providing a lowering of the price or a free sample of the product, whether the coupon is offered and distributed by the manufacturer of the product or whether the coupons are supplied by the retail outlet, such as a supermarket chain in order to promote business.

The advantages of using the product coupons to obtain price reductions is a well established practice. The manufacturer of goods uses the coupons to promote sales of a particular product and in particular to promote the sales of new products or improved products in the market place. A consumer is given the coupons in newspapers, magazines, and even in the mail. The consumer is then expected to take these coupons to the store and receive an immediate price reduction upon purchase of the particular named goods. The problem arises that the consumer is deluged by hundreds and even thousands of coupons on a wide variety of goods, most of which the consumer cannot purchase or use in a single week. On the other hand, the coupons are sometimes good for months or even indefinitely. The consumer wishes to have the coupons organized so that he or she, when entering the store, and locating a particular item that he or she wishes to purchase, can then determine whether a coupon is available as a discount for that particular product. Further, when the consumer reaches an area of the store where there are many different brand names of a particular product, the consumer will typically make the choice between brand names depending upon the availability of coupons to get a reduced price. This is particularly important in "double" or even "triple" coupon days when the store runs a promotion which doubles the discount or triples the discount for any coupons used that day.

Not only is organization of the large supply of coupons, important, but also storage and protection of the coupons are important. Because the number of coupons involved, it has been necessary for persons to bring shoe boxes into the store full of coupons. The prudent shopper, who wishes to take advantage of the coupons only when he or she actually needs the product, requires a substantial storage and filing system.

A number of devices have been provided to store coupons. These are typically small pouches and small boxes which can be carried into the store in a purse or a pocket. Unfortunately, the storage capabilities of such devices are insufficient if the consumer wants to control the coupons as contrasted to being controlled by the lesser number of coupons available in a particular week. Large boxes are unwieldy and cannot be easily handled and used while moving through a supermarket and pushing a shopping cart. About the only way to hold a shoe size box container in such situations is to place the box on the "seat bottom" of the infant seat of typical shopping carts. It is virtually impossible to not only hand a shoe size box and an infant in a shopping cart effectively. The typical basket construction has a steel rod running entirely around the top edge of the basket. The handle which is used to push the basket is typically placed a short distance rearwardly from the rear top edge bar of the basket. The distance between the steel seat back bar and the rear top edge bar and the handle.

The design and construction of shopping carts varies widely but there is a commonality in that the infant seat typically opens inwardly into the basket cavity of the shopping cart. The seat back has a steel bar across the top, which in the open position is spaced away from the rear top edge bar of the basket, varies between shopping cart manufacturers, but two similar bars exist in essentially all shopping carts. Certain devices such as portable desks and like items have been supported between these two bars. These desks device are useful for shopping lists and writing notes, but do not fulfill the needs relating to coupon organization and storage.

The above needs relating to coupon organization and storage and in particular to provide a device that can be easily used while operating a shopping cart, has not been satisfied by the present devices nor have the objects listed herein below been satisfied by other prior art devices.

SUMMARY OF THE INVENTION

It is an object of the present invention to provide a coupon box container which has the versatility of storing relatively large quantities of products coupons to allow efficient separation of the coupons so that any particular type of coupon may be readily located within the container.

It is a further object of the present invention to provide a coupon box container which may be opened and closed to protect the coupons and the opening and closing may be done from any direction at the choice of the user.

It is an additional object of the present invention to provide a coupon box container that will fit in and rest on the "infant seat" in typical shopping cart constructions.

It is a further object of the present invention to provide a coupon box and container which may be attached to a similar container to provide double storage capacity as the coupon collection grows and additional space is needed.

It is a further object of the present invention to provide a coupon box and container which may be attached on any side to additional coupon boxes so that the shape and capacity is essentially unlimited.

It is a further object of the present invention to provide a coupon box and caddy which may be attached to and be supported between the rear bar of the top edge of the basket and the upper bar of the back of the infant seat of typical shopping carts.

It is a further object of the present invention that a plurality of coupon boxes be attached together and together the structure spans the distance between the rear basket bar and the back of the seat bar and be supported above the infant seat.

It is a particular object invention to provide a coupon box device which will span the distance and attach to the rear basket bar and the back seat bar leaving the infant seat free to hold fragile food purchased in the market.

It is an additional object of the present invention to provide a coupon box device which will be adjustable as to the distance between the rear basket bar and the back seat bar so as to interfit and interlock onto those bars, as the distance between those bars various from shopping carts.

It is an additional object of the present invention to provide an adjustable back support for the coupons which is adjustable to hold the coupons in a vertical position and expand to provide additional room as the coupon collection grows.

It is a further object of the present invention to provide a frame and writing support device fixed under the lid of the coupon box to provide a place for the shopping lists and notes and marks to be placed on the list during the shopping process.

It is a particular object of the present invention to provide an attachment device to support and connect the coupon box or boxes to the rear basket bar and the back seat bar with the attachment device removable from the coupon box when not being used.

It is an additional particular object of the present invention to provide a device that includes one coupon box and a pair of attachment devices to connect a pair of boxes to the rear basket bar in the back seat bar of the shopping cart, making the attachment devices interchangeable in case of breakage or particularly unusual shaped shopping carts.

The device of the present invention is a product coupon container to attach to a shopping cart and more particularly to the rear horizontal upper edge bar of the basket and span the distance and attach to the horizontal bar at the top of the open infant seat back of the typically shopping cart. The device includes a container, in the general form of a box, having a length and width, both dimensions preferably being sufficient to receive the largest of the products coupons, the container having a bottom and four upright sides. The device includes a lid top member covering and enclosing the contents of the container, the member being hingeably attached to the top edge of one of the upright sides. An attachment device to attach the container to the rear upper edge bar of the basket and to the horizontal bar of the seat includes a pair of horizontal members attached and extending downwardly from the container's lengthwise bottom edges and a plurality of cut out holes transversely cut out through the horizontal members, the plurality of holes being spaced along the length of the members. These holes not only open to the sides of the members, but further open downwardly through the bottom edge of the members. The cut out holes are preferably round and open downwardly through the bottom edge of the horizontal members to a minor distance of the arc such that once the hole is interfitted over a horizontal bar, it tends to remain on the bar in an interlocked position. It is preferred that each device further includes an interlocking device to interlockingly connect two of the containers such that the combined length spans the distance between the rear basket bar and the seat back bar allowing the holes of the attachment device to interfit over and around the bars to support the containers.

BRIEF DESCRIPTION OF THE DRAWINGS

FIG. 3 is a cross-sectional view along lines 3—3 of FIG. 2.

FIG. 4 is a perspective view of a coupon box of the present invention.

FIG. 5 is a perspective view of the coupon box illustrated in FIG. 4 with the lid repositioned of the back support repositioned within the container.

FIG. 8 is a perspective view of two coupon containers of the present invention being connected side to side.

FIG. 9 is a perspective view of four coupon containers of the present invention interlocked and attached together to form a composite unit.

DESCRIPTION OF PREFERRED EMBODIMENTS

Figure 1:
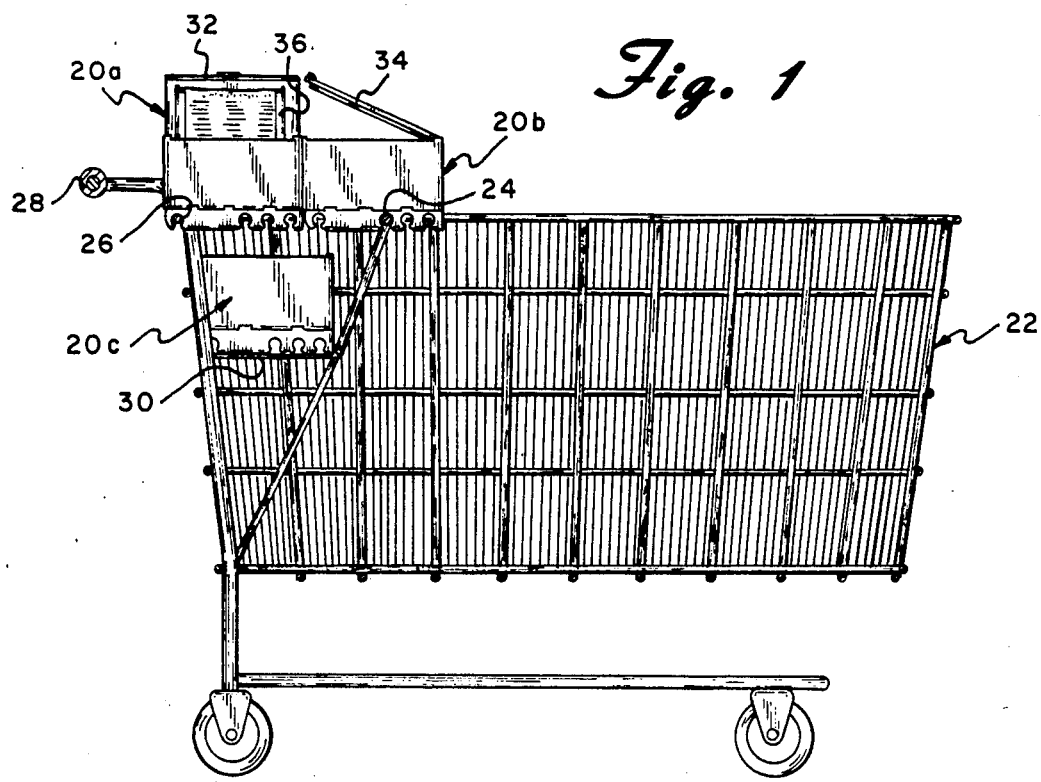
FIG. 1 is a schematic representation of a shopping cart with two of the devices of the present invention interlocked together and interlockingly supported on the bars of the shopping cart with a third device of the present invention resting on the seat bottom of the infant seat of the shopping cart.

It is preferred that the cut out transverse holes cut out through the horizontal members be circular and it is preferred that one hole be proximate to one end of each horizontal member and a plurality of holes be positioned proximate to the other end spaced along the length of the member. In this fashion, one hole interconnects over the rear top edge bar of the basket with the downwardly depending edge of the device passing between that top edge bar and the handle push bar of the cart. The plurality of holes at the other end of the horizontal member allow for differences in cart manufacture and distance between the two bars. The back of the infant seat need not be fully opened and the interconnection with the two bars will hold the seat back bar in the partially open position. A preferred lid device includes a flat panel member hingeably connected along one edge to at least one inverted "U" shaped member of a shape and size to springably engage over the top edge of one of the container's upright sides. Another lid top member device includes horizontal hinge projections extending proximate from two adjacent corners of the top member in a same line and horizontal detenting notches proximate to all inside corners of the container opening upwardly to receive the horizontal projections, allowing the top member to attach and pivotally open from the top edge of any side of the container.

It is preferred that the device include an adjustable coupon back support device including pairs of horizontal projections extending inwardly from at least two opposing interior vertical surfaces of the sides wherein each pair of projections are spaced apart to receive a support panel member interfitted between the projections and held vertically in the container. It is further preferred that the back support device comprise a plurality of vertical projections extending upwardly from the bottom of the container spaced to engage the bottom edge of the support panel and also to provide bottom edge support to the coupon stored in the container.

It is preferred that a device to hold shopping lists and like papers be a frame attached to the underside of the top lid member, the frame having a bottom frame member proximate to the hinge connection of the top lid and two frame member sides extending away from the edge that is hingeably attached to the coupon container. The frame members are undercut to allow a sheet of paper to slide under the frame from the open end and be supported in place.

It is preferred that the interlocking means to interconnect the coupons of the present invention be located on outside surface of each side. It is further preferred that the interlocking means include interlocking vertical opposing shoulders and vertical opposing slots opening at one end positioned and sized to allow one container to be vertically slideably interconnected with a second container with opposing surfaces being detenting to keep the containers together.

It is further preferred that the horizontal members of the attachment device be detachable from the container, being detentably engageable and disengageable from the bottom lengthwise edges of the container and that the horizontal members be identical integral moldings. It is more preferred that the horizontal members be hingeably connected to the lengthwise edges of the box, folding flat against or into recesses in the bottom of the box. Detents are provided to hold the horizontal members vertical in the operating positions and to hold the members in a horizontal position when folded under the box.

The product coupon container and attachment devices 20 are shown attached to and placed on a schematic illustration of shopping cart 22. Devices 20a and 20b are interconnected to each other and span the distance to interlock and be supported on top bar 24 of the infant seat of shopping cart 22 and rear top edge bar 26 of the basket of shopping cart 22. Device 20c is shown resting on seat bottom 30 of the infant seat of cart 22. Lid 32 is shown opening to the side in device 20a while lid 34 is shown opening toward the rear of device 20b. Frame 36 is shown on the underside of lid 32 holding a shopping list or like paper.

Figure 2:
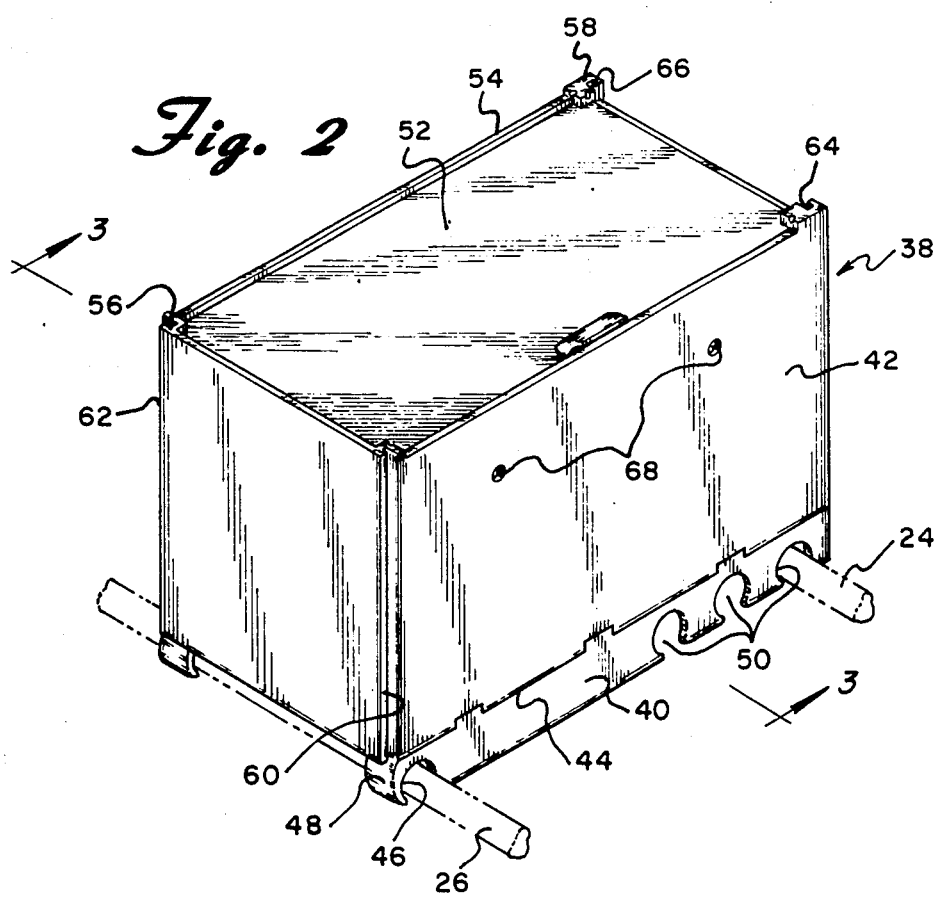
FIG. 2 is a perspective view of a coupon container of the present invention.

In FIG. 2, coupon storage device 38 is shown spanning the distance between rear top edge bar 26 and top bar 24 interconnected and interlocked on these bars through horizontal connection members 40 which interconnects with the bottom of box 42 along the lengthwise edges 44. A plurality of holes 50 are transversely cut through horizontal member 40 with hole 46 positioned close to one end of member 40 with a relatively narrow depending edge 48 allowing that member to be inserted between the rear top edge bar of the basket and handlebar 28 which, in some shopping basket designs are close together. A plurality of holes 50 are positioned along the length of member 40 toward the opposite end of that horizontal member. Holes 50 are positioned such that at least one of them will interlock and be supported on bar 24. Lid 52 interconnects with and pivots from edge 54 with horizontal projections extending outwardly from the corners of lid 52 toward corners 56 and 58. Upwardly open detented notches receive the horizontal extensions allowing lid 53 to pivot upwardly to the side from edge 54. Coupon storage device 38 may be interconnected with a similar device through a slideable interconnection of opposing shoulders 60 and 62 of which slideably engage in approaching slots 64 and 66. Shoulders 60 and 62 extend in the same plane away from each other from opposite adjacent vertical edges of box 42. Likewise, slots 64 and 66 extend along opposite adjacent vertical edges of box 42 and are faced approaching each other such that the combined distance and shape of a side of box 42 between shoulders 60 and 62 slideably interfits with another box container into slots 64 and 66 to form a double unit. Holes 68 in the vertical side wall of box 42 allow permanently interconnection of coupon boxes of the present invention. In FIG. 3, the interior of box 42 is illustrated as a completely enclosed container using lid 52 which pivots on horizontal members that projections engaging into notches 70 opening upwardly and detented to receive the projections. A back support device to hold the coupons in a vertical position includes panel member 72 held in a vertical position by pairs of projections 74. Each pair of projections 74 extend horizontally from the inside upper surfaces of each wall of box 42. Pairs 74 are spaced apart along the upper edge of the periphery of the box and each pair is positioned opposite another pair on the opposing wall such that panel 72 is slideably engaged into two pairs of projections and held vertically to prevent coupons from falling flat. Vertical projections 76 extend upwardly from the bottom inside surface of box 42, which may be like into a "roughened" surface to provide support from panel 72, tending to hold it in a vertical position. In addition, projections 76 tend to aid in the support of the coupons in a vertical position. All of the above parts are injection molded of a thermoplastic polymeric material. Plastic materials suitable for construction of these devices include but are not limited to polystyrene, high impact polystyrene, acrylonitrile butadiene styrene copolymers, polycarbonate, engineering plastics including crystalline polymers, polypropylene, polyethylene, and like polymers. All of the above components are injection molded into a single integral unit, or they are detachable as illustrated as separated molded parts interconnected by detent interlocking surfaces.

Figure 7:
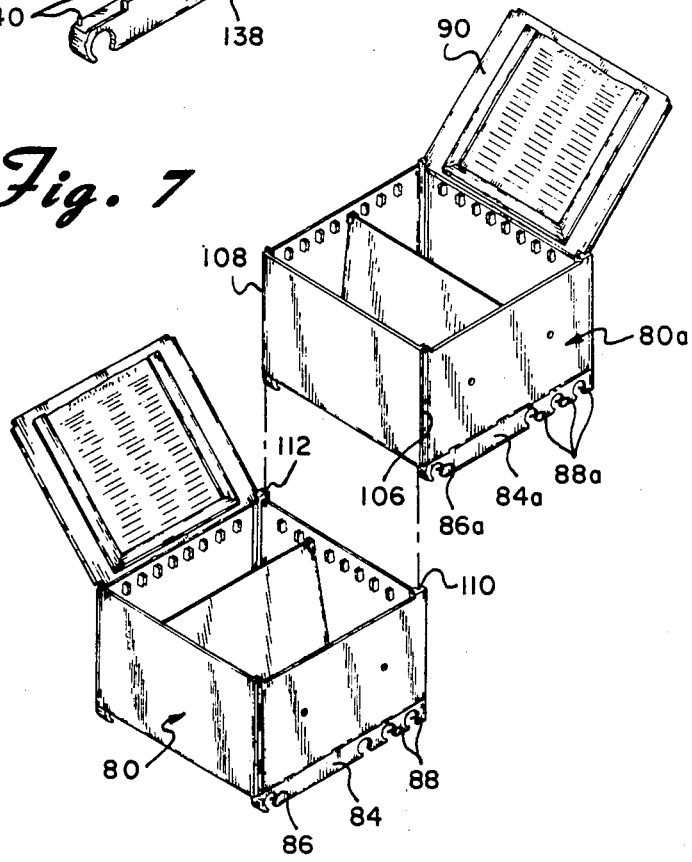
FIG. 7 is a perspective view of two coupon containers of the present invention showing interlock between two of them to achieve a sufficient distance to span the distance between the bars of the shopping cart.

In FIG. 4, coupon container device 80, molded out of impact polystyrene plastic polymer, has an interior dimensions of about 6½ inches by 6½ inches by about 4 inches high. Horizontal connection members 84 have holes 86 at one end and a plurality of holes 88 at the other end. The length of the box and horizontal member 84 of about six inches is generally insufficient to span the distance between the two bars in the open position on the shopping cart. However, this is a very effective size for storing a large quantity of coupons and is further useful in that the coupons can be stored in either direction. Device 80 has the coupons being stored lengthwise with lid 90 opening and pivoting from left side 92 of box 82. Back support panel 94 is supported vertically and supports the coupons in any of pairs of projections 96. The underside of lid 90 is positioned frame 98 including lower frame member 100 positioned close to the top edge of the pivot of lid 90 and to upright frame members 102 and 104 extending upwardly from the lower frame member. A slot is provided under a portion of the frame members between them and bottom surface of lid 90 allowing a piece of paper such a shopping list to be inserted from the upper end of upright members 102 and 104 and sliding under the frame and supported by lower frame member 100. In FIG. 5, a similar and essentially identical coupon storage device 80a is illustrated. This may be a different container or it may be the identical container 80 with lid 90 repositioned on the end rather than along the width of box 82. Similarly, the only difference between the two units is that panel 94 has been switched so that it now in position to hold the coupons sideways rather than lengthwise as in unit 80. That is illustrated in FIG. 7. In order to join devices 80 and 80a to provide a combined double unit, shoulders 106 and 108 until 80a are engaged into vertical slots 110 and 112 of container 80. A detent is provided so that the part are not easily disengaged. Once the two units are joined, the combined length of horizontal members 80 and 80A is now sufficient to span the distance between the top bar of the infant seat and the rear top edge bar of the basket. Hole 86 engages bar 26 and one of holes 88 engages bar 24 of cart 22.

Figure 6:
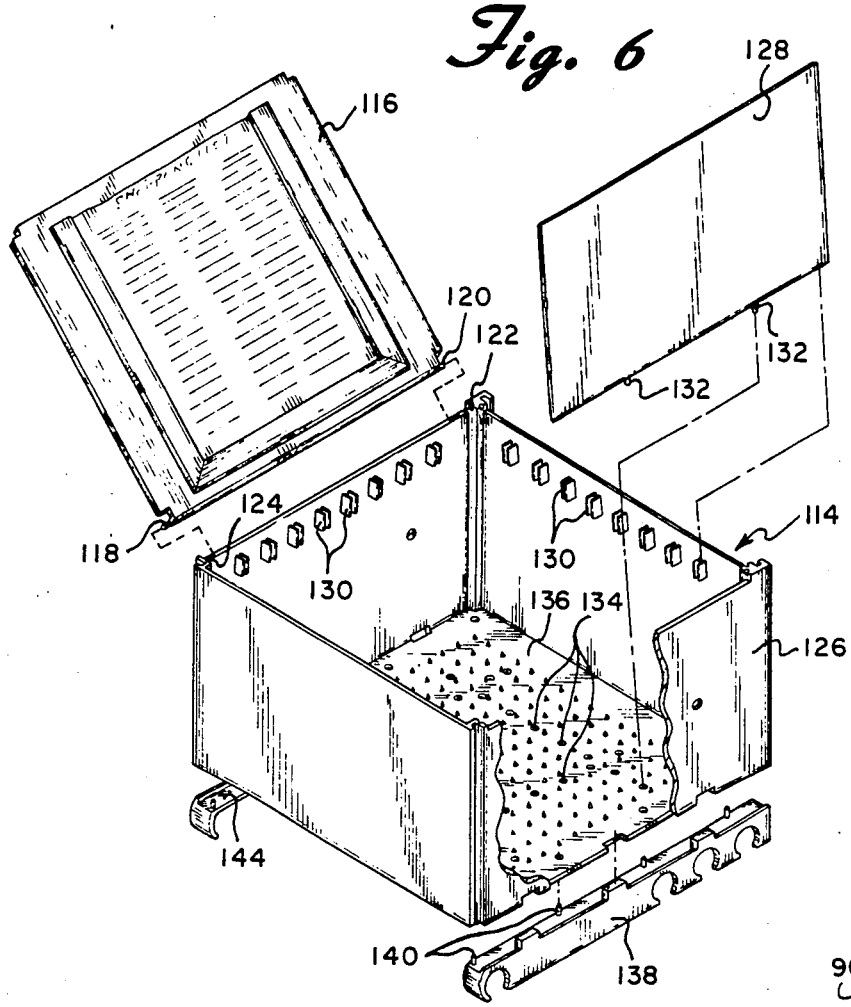
FIG. 6 is an exploded perspective view of the coupon box illustrated in FIG. 4.

The coupon holder device 14 illustrated in FIG. 6 is essentially identical to that of device 80 illustrated in FIG. 4 in most regards. Lid 116 interfits and pivots in the same fashion and is exploded outwardly to illustrate the connection. Horizontal dowel shaped extensions 118 and 120 extend outwardly from the lower edge of lid 116 and engage into notches 122 and 124 (hidden), both notches being engaged into the corners of box shape 126. In this embodiment, panel 128 is not only held in position by projection pairs 130 extending inwardly, to hold the upper portion 128 vertical, but 128 is also held in position by engagement of dowel like extensions 132 into double adjacent lines of holes 134 spaced along the bottom of box 126. Horizontal connection member 138 is detachably attached to the bottom of box 126 through rod extensions and block extensions 142 which interfit into corresponding apertures in bottom 136 of box 126. Horizontal attachment member 44 is a mirror image shape of 138 and connects in the same fashion.

In FIG. 8, coupon containing device 80 is attached to a similar coupon container device 80C using bolts and nuts 146 through holes 97 in the lengthwise walls of box shape 82. The only difference between container 80C and container 80 is that lid 90 has been engaged in the opposite wall upper edge of container 80C. In FIG. 9, two coupon containing devices 80 are interconnected with two additional coupon containing devices 80A. Essentially, two of the double box devices illustrated in FIG. 7 are connected together by bolting them together. As illustrated, these four units now span the distance between bars 24 and 26 should provide sufficient coupon capacity for each even the most avid collectors. When all of the lids are placed in a downward position, an effective large table work space is provided.

Figure 10:
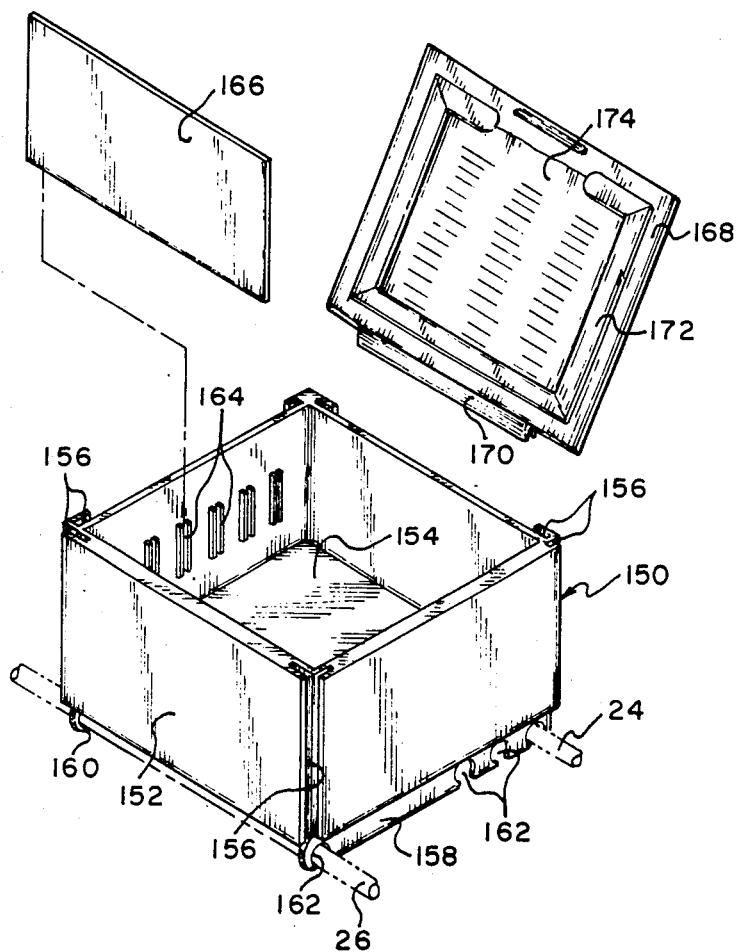
FIG. 10 is an exploded perspective view of another embodiment attachment device interconnected over the bars of the shopping cart.

FIG. 10 is an exploded perspective view, the final illustrated embodiment of this invention in the form of coupon carrying and storage device 150 including a box of vertical walls 152 integrally molded with bottom 154 interlocking grooves and extensions 156 at each corner, two for each wall 52 extending vertically along the outside corner, allow multiple interconnections of box 150 with other boxes of the same design. Thus, two or more boxes may be interconnected sideways so that both boxes 150 span across and interconnect with bars 26 and 24, or in the alternative, may be connected lengthwise so that the combined length spans the distance between bars 26 and 24. At the bottom, horizontal members 158 and 160 (mostly hidden) extend downwardly and with apertures 162 interconnect over and snap fit on bars 26 and 28. In this embodiment, the child's seat back bar 24 is pulled to a partially closed position in order to allow box 150 to span the distance. Vertical lids 164 are molded in pairs on two sides of the interior of walls 152 opposed to each other and spaced to allow rear cart support panel 166 to be ix at chosen positions spanning the interior of the box from side to side to hold the coupons in a vertical alignment. Lid 168 is molded out of a separate plastic molding the cover and close box 150 attachable on any wall side through hinge member 170 which is essentially a "U" shaped springable portion of the molding hingeably attached through a thin section of plastic to lid 168 and extending away from lid 168 to snap fit over the top edge of any vertical wall 152 of box 150. Frame 172 is attached to the underside of lid 168 allowing a sheet of paper 174 to be inserted into and under the frame to be held in position against the underside of lid 168 for note taking and shopping lists or the like.

Figure 11:
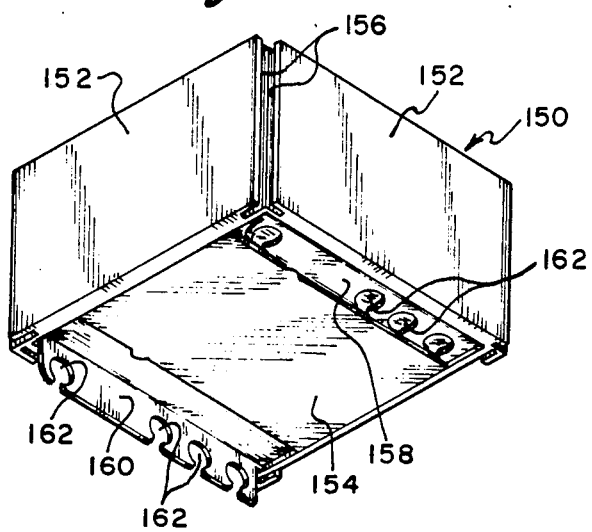
FIG. 11 is a perspective view of the bottom of the coupon box FIG. 10.

FIG. 11 is a perspective view of the underside of box 150 showing horizontal member 158, now hingeably folded inwardly and upwardly to a nonfunctioning position. Horizontal member 160 together with holes 162 is in the downward operative position capable of interconnection with rods 26 and 24. Horizontal members 158 and 160 are hingeably connected through a thin web of plastic to bottom 154. The horizontal members may be distended downwardly in an operative position held in position with a detent, or in the alternative may be folded inwardly and upwardly to another detent position when box 150 is not being interconnected with the shopping cart.

While this invention has been described with reference to the specific embodiments disclosed herein, it is not confined to the details set forth and the patent is intended to include modifications and changes which may come within and extend from the following claims.

I claim:

1. A product coupon container device to attach to a shopping cart and more particularly to the rear horizontal upper edge bar of the basket and to the horizontal bar at the top of the opened infant seat back of the shopping cart comprising:
   (a) a box container having a length and width, both dimensions being sufficient receive the largest of product coupons, the container further having a bottom and four upright sides,
   (b) a lip top member covering and enclosing the contents of the container hingeably attached to the top edge of one of the upright sides,
   (c) attachment means to attach the container to the rear upper edge bar of the basket and to the horizontal bar of the seat comprising:
      (i) a pair of horizontal members hingeably attached and extending downwardly from the container's two lengthwise bottom edges to pivot inwardly and under the box container, and
      (ii) a plurality of cut-out transverse holes cut out of the horizontal members spaced along the length of the members, said holes not only opening to the sides of the members, but further opening downwardly through the bottom edge of the members.

2. The device of claim 1 which further comprises an interlocking means to interlockingly connect two of the containers such that the combined length spans the distance between the rear basket bar and the seat back bar allowing the holes to interfit over and around the bars to support the container.

3. The device of claim 1 wherein the holes are circular, one hole proximate to one end of each horizontal member and a plurality of holes proximate to the other end spaced along the length of the member.

4. The device of claim 1 wherein the lid top member comprises horizontal hinge projections extending proximate from two adjacent corners of the top member in a same line and horizontal detented notches proximate to inside surfaces of all corners of the container opening upwardly to receive the horizontal projections, allowing the top to attach and pivotally open from the top edge of any side of the container.

5. The device of claim 1 wherein the lid comprises a flat panel hingeably connected along one edge to at least one inverted "U" shaped member of a shape and size to springably engage over the top edge of one of the container's upright sides.

6. The device of claim 1 which further comprises an adjustable coupon back support device comprising pairs of horizontal projections extending inwardly from opposite interior vertical surfaces of at least two sides, wherein each pair of projections are spaced apart to receive a support panel member interfitted between the projections and held vertically in the container.

7. The device of claim 6 wherein the back support device further comprises a plurality of vertical projections extending upwardly from the bottom spaced to engage the bottom edge of the support panel.

8. The device of claim 1 wherein a frame is attached to the underside of the top lid member having a bottom frame member proximate to the hinge connection and two frame member sides extending away from the hinge connection, the frame members undercut to allow a sheet of paper to slide under the frame from the open end and be supported in place.

9. The device of claim 2 wherein the interlocking means is on the outside surface of each side.

10. The device of claim 9 wherein the interlocking means comprises interlocking vertical opposing shoulders and vertical opposing slots opening at one end to allow one container to be vertically slideably interconnected with a second container with opposing surfaces being detented to keep containers together.

11. A product coupon container device to attach to the horizontal handle bar and to the horizontal bar at the top of the opened seat back of a shopping cart comprising:
   (a) a box container having a length and width, both dimensions being sufficient receive the largest of store or product coupons, the container further having a bottom and four upright sides,
   (b) a lid top member covering and enclosing the contents of the container hingeably attached to the top edge of one of the sides,
   (c) attachment means to attach the container to the horizontal handle bar and to the horizontal seat bar comprising:
      (i) a pair of horizontal members hingeably attached and extending downwardly from the container's lengthwise bottom edges to pivot inwardly and under the box container, and
      (ii) a plurality of cut-out transverse holes cut out of the horizontal members spaced along the length of the members, said holes not only opening to the sides of the members, but further opening downwardly through the bottom edge of the members, and
   (d) interlocking means to interlockingly connect two of the containers such that the combined length spans the distance between the handle bar and the seat back bar allowing the holes to interfit over and around the bars supporting the container. container.

12. The device of claim 11 wherein the holes are circular, one hole proximate to one end of each horizontal member and a plurality of holes proximate to the other end spaced along the length of the member.

13. The device of claim 11 wherein the lid comprises a flat panel hingeably connected along one edge to at least one inverted "U" shaped member of a shape and size to springably engage over the top edge of one of the container's upright sides.

14. The device of claim 13 which further comprises an adjustable coupon back support device comprising pairs of horizontal projections extending inwardly from at least two opposing interior vertical surfaces of the sides, wherein each pair of projections are spaced apart to receive a support panel member interfitted between the projections and held vertically in the container.

15. The device of claim 11 wherein the back support device further comprises a plurality of vertical projections extending upwardly from the bottom spaced to engage the bottom edge of the support panel.

16. The device of claim 11 wherein a frame is attached to the underside of the top lid member having a bottom frame member proximate to the hinge connection and two frame member sides extending away from the hinge connection, the frame members undercut to allow a sheet of paper to slide under the frame from the open end and be supported in place.

17. The device of claim 11 wherein the interlocking means is on outside surface of each side.

18. The device of claim 11 wherein the interlocking means comprises interlocking vertical opposing shoulders and vertical opposing slots opening at one end to allow one container to be vertically slideably interconnected with a second container with opposing surfaces being detented to keep containers together.

* * * * *